United States Patent [19]

Kim

[11] Patent Number: 5,491,518
[45] Date of Patent: Feb. 13, 1996

[54] EQUALIZATION APPARATUS WITH FAST COEFFICIENT UPDATING OPERATION

[75] Inventor: Young-Sang Kim, Seoul, Rep. of Korea

[73] Assignee: Daewoo Electronics Co., Ltd., Seoul, Rep. of Korea

[21] Appl. No.: 375,326

[22] Filed: Jan. 18, 1995

[30] Foreign Application Priority Data

Jan. 18, 1994 [KR] 'Rep. of Korea ................. 1994-755

[51] Int. Cl.$^6$ ............................................. H04N 5/21
[52] U.S. Cl. ....................... 348/607; 348/614; 375/233
[58] Field of Search ............................. 348/607, 611, 348/614, 726; 364/724.2, 724.1, 724.16; 375/232, 233, 350; 333/18, 28 R; H04N 5/21

[56] References Cited

U.S. PATENT DOCUMENTS

| | | | |
|---|---|---|---|
| 3,868,603 | 2/1975 | Guidoux | 333/18 |
| 4,404,600 | 9/1983 | Murakami | 348/614 |
| 4,483,009 | 11/1984 | Honda et al. | 364/724.2 |
| 5,027,369 | 6/1991 | Kuenast | 375/14 |
| 5,293,234 | 3/1994 | Ko | 348/614 |
| 5,363,145 | 11/1994 | Go | 348/614 |

FOREIGN PATENT DOCUMENTS 0239153  9/1987  European Pat. Off. ........ H04L 25/03

OTHER PUBLICATIONS

R. A. Peloso, "Adaptive Equalization for Advanced Television", IEEE Transactions on Consumer Electronics, vol. 38, No. 3, pp. 119–126 (Aug., 1992).
T. Liu et al., "Simulation and Implementation of US QAM-based HDTV Channel Decoder", IEEE Transactions on Consumer Electronics, vol. 39, No. 3, pp. 676–682 (Aug., 1993).
Y. S. Choi et al., "Adaptive Blind Equalization Coupled with Carrier Recovery for HDTV Modem", IEEE Transactions on Consumer Electronics, vol. 39, No. 3, pp. 386–391 (Aug., 1993).
M. Obara et al., "A Digital Time Domain Equalizer for Teletext", IEEE Transactions on Consumer Electronics, vol. 28, No. 3, pp. 447–452, (Aug., 1982).

*Primary Examiner*—James J. Groody
*Assistant Examiner*—Jeffrey S. Murrell
*Attorney, Agent, or Firm*—Anderson Kill Olick & Oshinsky

[57] ABSTRACT

An improved equalization apparatus includes updating circuit for generating, in response to the received television signal and the error signal, a set of updated filter coefficients as the set of the filter coefficients for the equalizer filter, which comprises: a shift register for storing and shifting a data sample to provide a set of the data samples; a multiplier for multiplying a error signal with the set of the data samples to provide a set of error weighted data samples; a scaling circuit, in response to a blind mode signal, for scaling down the set of error weighted data samples with a first scale value in order to generate a first set of scaled error weighted data samples and, in response to a decision mode signal, for scaling down the set of error weighted data samples with a second scale value to generate a second set of scaled error weighted data samples; an adder for adding the first or the second set of scaled error weighted data samples to a set of previous filter coefficients in order to produce a set of updated filter coefficients as an output of the updating circuit; and a FIFO buffer for storing the set of updated filter coefficients as the set of previous filter coefficients for the adder.

3 Claims, 2 Drawing Sheets

EQUALIZATION APPARATUS WITH FAST COEFFICIENT UPDATING OPERATION

FIELD OF THE INVENTION

The invention relates to an equalization apparatus for use in a high definition television (HDTV) signal receiving system; and, more particularly, to an improved equalization apparatus which is capable of providing a speedy coefficient updating operation.

DESCRIPTION OF THE PRIOR ART

In a HDTV system, television signals from a television signal transmission source are transmitted over a transmission channel such as radio channel to a HDTV signal receiving end. One of the inherent problems associated with the transmission of television signals over the transmission channel is that channel distortions and additive noises tend to disrupt, e.g., data symbols contained in the transmitted television signal, thereby adversely affecting the ability of the HDTV signal receiving system to distinguish the received symbol levels. To ameliorate this problem, a typical HDTV signal receiving system includes a channel adaptive equalizer.

Such a prior art channel adaptive equalizer employs a filtering device that removes from a received signal the amplitude and phase distortions resulting from, e.g., a frequency dependent time-variant response of the transmission channel, to thereby provide an improved symbol decision capability. Specifically, the channel adaptive equalizer emulates the transfer function of the transmission channel and applies the inverse of the transfer function to the received signal so as to rectify the distortion effects.

One of such equalization apparatus for use in a HDTV signal receiving system is disclosed in an article by Samir N. Hulyalkar et al., "Advanced Digital HDTV Transmission System for Terrestrial Video Simulcasting", *IEEE Journal on Selected Areas in Communications*, 11, No. 1, pp 119–125 (January, 1993), which includes a finite impulse response (FIR) filter having a plurality of equalizer coefficients called tap coefficients and a coefficient updating module to provide a self-adjustment without the need to use a training sequence. The coefficient updating module is operated in two steps: a blind mode; and a decision directed mode. In the blind mode, the filter coefficients are coarsely adjusted up to their initial values, in response to a coarse error signal which is calculated by employing a known nonlinear function. In the decision directed mode, the filter coefficients are finely updated up to their optimum values by using a decision error signal which is calculated by using a known decision function.

However, since the filter coefficients to be updated are iteratively calculated and updated by using a single processing device, such equalization apparatus requires a substantial amount of calculation time to obtain the updated coefficient.

SUMMARY OF THE INVENTION

It is, therefore, a primary object of the invention to provide an improved equalization apparatus which is capable of providing a high speed updating operation.

In accordance with the invention, there is provided an equalization apparatus for use in a television signal receiving system, which includes an equalizing filter having a set of filter coefficients for equalizing a received television signal distorted from an original signal in a transmission channel to produce a filtered output signal, wherein the received television signal includes a plurality of data samples and the filtered output signal has a corresponding plurality of filter output data samples; and error signal generating means for storing a set of error values, and for generating, in response to a filtered output data sample, an error signal corresponding to said filtered output data sample; and updating circuit for generating, in response to the data sample and the error signals, a set of updated filter coefficients as the set of filter coefficients for the equalizer filter, wherein the updating circuit comprises: a shift register for storing and shifting the data sample to provide a set of the data samples; a multiplier for multiplying a error signal with the set of the data samples to provide a set of error weighted data samples; a scaling circuit, in response to a first control signal, for scaling down the set of error weighted data samples with a first scale value in order to generate a first set of scaled error weighted data samples and, in response to a second control signal, for scaling down the set of error weighted data samples with a second scale value to generate a second set of scaled error weighted data samples; adder means for adding the first or the second set of scaled error weighted data samples to a set of previous filter coefficients in order to produce a set of updated filter coefficients as an output of the updating circuit; FIFO buffer means for storing the set of updated filter coefficients as the set of previous filter coefficients for the adder means; and control means for generating the second control signal when the mean square error of the filtered output signal is identical to or smaller than a predetermined threshold value and for generating the first control signal when the mean squared error is greater than the predetermined threshold value.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
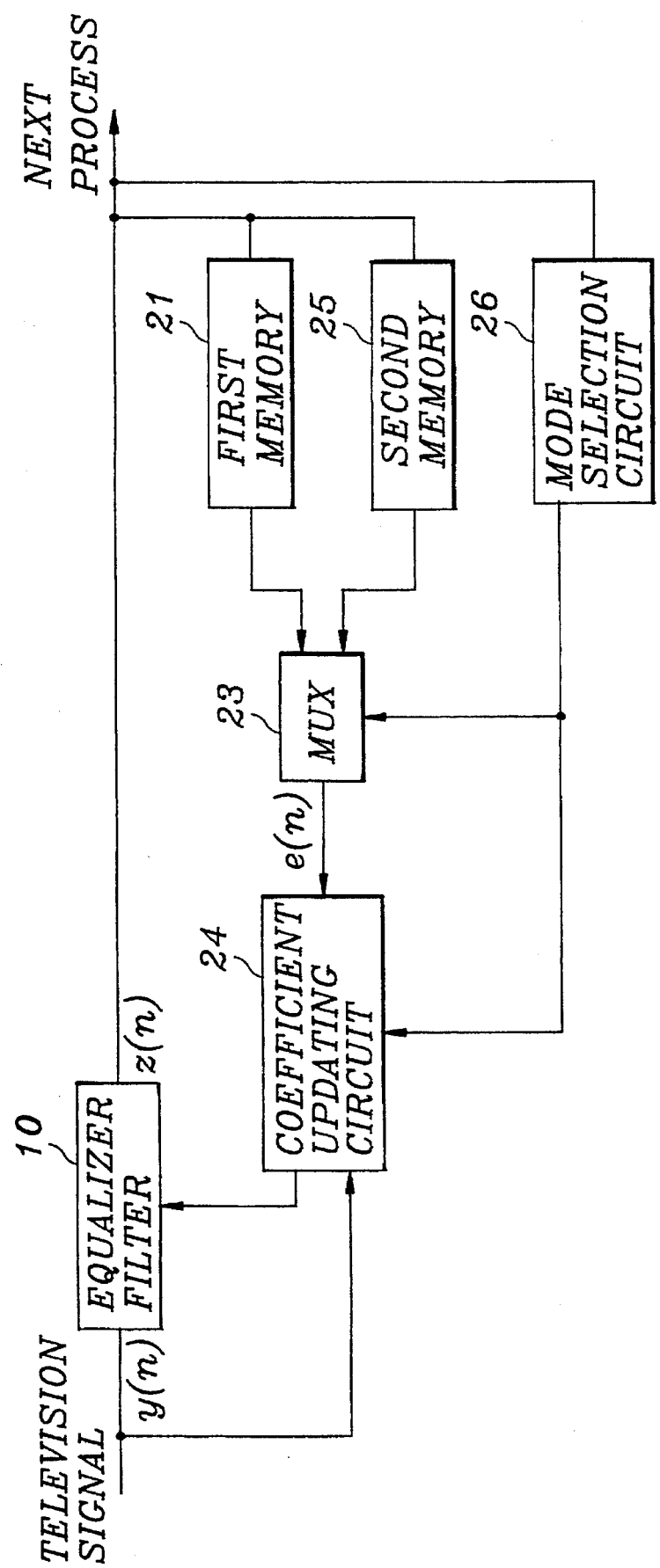
FIG. 1 is a schematic block diagram of a television signal equalization apparatus employing the coefficient updating circuit in accordance with the present invention.

Referring to FIG. 1, there is shown an equalization apparatus in accordance with the present invention. The equalization apparatus includes an equalizer filter circuit 10 having a set of filter coefficients, and a coefficient update module 20 for updating the set of filter coefficients.

A received television signal is sampled by a known sampling circuit into a plurality of data samples which are sequentially coupled to the equalizer filter circuit 10 and the coefficient update module 20. The equalizer filter circuit 10 is comprised of a finite impulse response (FIR) filter wherein the received television signal from the transmission channel is filtered and equalized by using the set of filter coefficients contained therein in order to produce a filtered signal. The filtered signal includes a corresponding plurality of filtered data samples which are sequentially coupled to the coefficient update module 20 and to a next processor, e.g., a decoder (not shown).

That is, the received television signal y(n) is coupled to the equalization apparatus and is filtered by the equalizer filter 10 to correct the received television signal y(n) distorted in a transmission channel (not shown) and produce the filtered signal as an equalized television signal that approximates the original non-distorted television signal prior to its transmission.

As is known, the filtered signal z(n) from the equalizer filter circuit 10 may be represented as follows:

$$z(n) = \sum_{i=0}^{M-1} w_i y(n-i) \quad (1)$$

wherein $\{w_i\}$ is a vector or set of filter coefficients for the equalizer filter; and M is a positive integer representing the number of the filter cells.

The set of filter coefficients W(n) are iteratively updated by the coefficient updating circuit 20 until an equalized television signal is obtained; and may be represented as follows:

$$W(n+1) = W(n) + \mu Y(n) \quad (2)$$

wherein Y(n) is a vector of the received data samples; $\mu$ is a small number, e.g., $2^{-10}$ or $2^{-12}$, representing a scale factor; and e(n) is an error signal. Therefore, the coefficient update module 20 operates to converge W(n) toward an optimum set of filter coefficients in order for the equalizer filter 10 to produce the filtered signal z(n) as the equalized television signal which approximates the original television signal.

As shown, the coefficient update module 20 is operated in two steps, i.e., a blind mode and a decision directed mode; and includes a first memory 21, a multiplexer 23, a coefficient updating circuit 24, a second memory 25 and a mode selection circuit 26. In the blind mode, the first memory 21, in response to the filtered data samples from the equalizer filter circuit 20, generates a first error signal which is coupled via the multiplexer 23 to the coefficient updating circuit 24.

A coarse error value representing the difference between a predicted filtered data sample and a predetermined fixed value is calculated and stored in the first memory 21, wherein a mean value of the original non-distorted data samples is preferably selected as the predetermined fixed value. In this manner, all of the coarse error values corresponding to all of the predicted filtered data samples are calculated and stored in the first memory 21 as a lookup table. In this case, assuming that a predicted filtered data sample is represented by T bits, the number of all of the combinable predicted filtered data samples and, hence, the required size of the memory is $2^T$, wherein T is a positive integer. In accordance with the present invention, the first memory 21 is implemented by using an electrically erasable programmable read only memory (EEPROM).

As described above, the first memory 21, in response to a filtered data sample corresponding to a predicted filtered data sample, serves to generate a first error signal representative of the corresponding coarse error value.

The coefficient updating circuit 24 receives the first error signals and the data samples corresponding to the filtered data samples in order to generate a set of coarsely updated coefficients, for providing an initial convergence, which are coupled to the equalizer filter 10. The coarsely updated coefficients for providing the initial convergence supersede the previous set of filter coefficients maintained within the equalizer filter 20.

On the other hand, in the decision directed mode, the second memory 25 receives the filtered data samples to generate a second error signal which is coupled via the multiplexer 23 to the coefficient updating circuit 24.

A fine error value representing the difference between a predicted filtered data sample and a corresponding original non-distorted data sample is calculated and stored in the second memory 25. In this manner, all of the fine error values corresponding to the predicted filtered data samples are calculated and stored in the second memory 25 as a lookup table. The second memory 25 is also implemented by using an electrically erasable programmable read only memory(EEPROM).

As described above, the second memory 25 is responsive to a filtered data sample corresponding to a predicted filtered data sample and generates a second error signal representative of the corresponding fine error value.

The coefficient updating circuit 24 receives the second error signals and the data samples corresponding to the filtered data samples to generate a set of finely updated coefficients in order to achieve an optimum convergence of the filter coefficients. The finely updated coefficients are coupled to the equalizer filter 10 to supersede the previous filter coefficients stored within the equalizer filter 10.

The mode change operation is controlled by using a mode selection circuit 26 for generating two mode selection signals: a blind mode signal, and a decision directed mode signal. That is, the mode selection circuit 26 receives the filtered signal in order to evaluate the mean square error(MSE) thereof. The MSE is compared with a predetermined threshold value which can be experimentally determined on the basis of the so-called eye pattern. When the MSE is greater than the predetermined error value, the mode selection circuit 26 generates a blind mode signal which serves to actuate the multiplexer 23 in order to couple the first error signal outputted from the first memory 21 as the error signal via the multiplexer 23 to the coefficient updating circuit 24.

On the other hand, if the MSE is identical to or smaller than the predetermined error value, the mode selection circuit 26 produces a decision directed mode signal which serves to operate the multiplexer 23 to couple the second error signal outputted from the second memory 25 as the error signal via the multiplexer 23 to the coefficient updating circuit 24.

Figure 2:
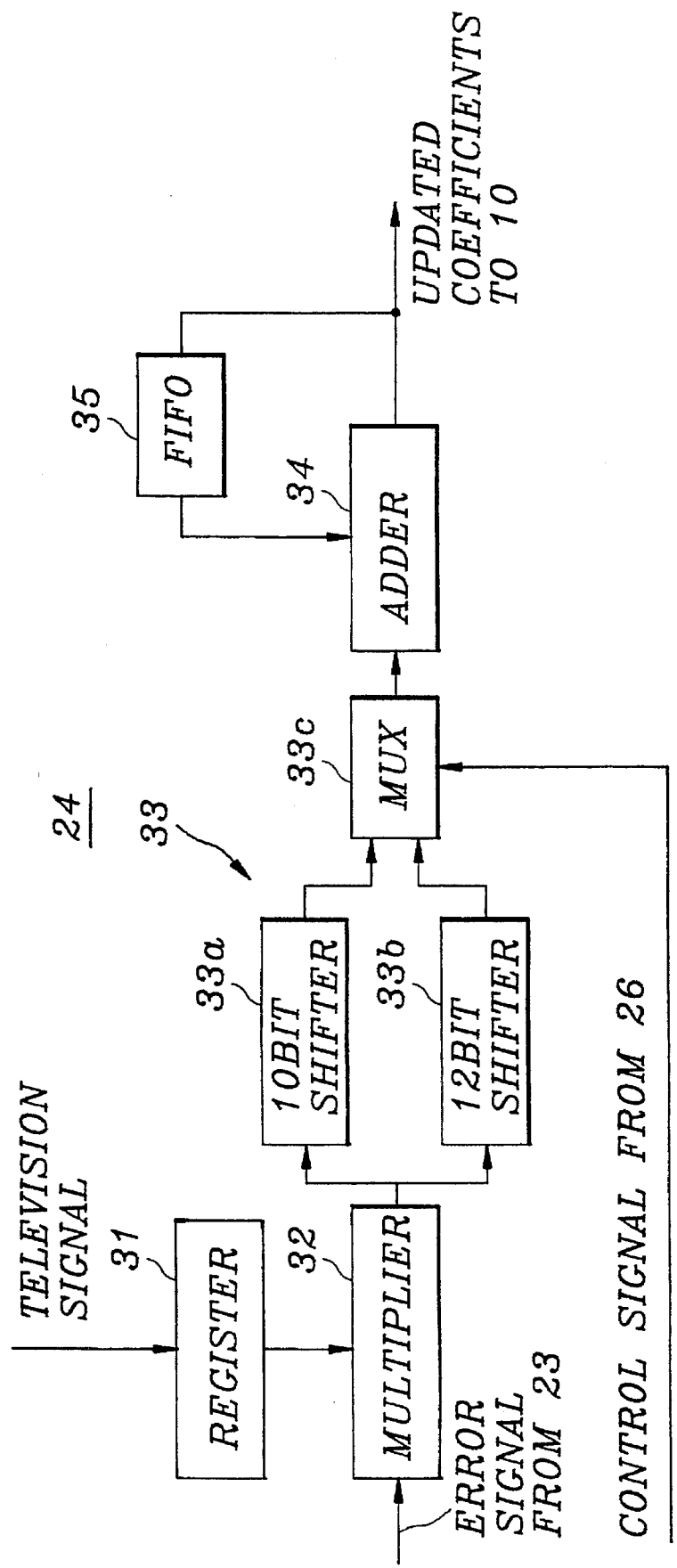
FIG. 2 is a detailed block diagram of the coefficient updating circuit shown in FIG. 1.

Referring to FIG. 2, there is shown a detailed block diagram of the coefficient updating circuit 24 in accordance with the present invention, which generates, in response to the received television signal and the error signals, a set of updated filter coefficients as the set of the filter coefficients for the equalizer filter, and includes a multiplier 32, a scaling circuit 33, an adder 34, a FIFO (first-in-first-out) buffer memory 35.

A current data sample is stored in a shifter register 31 which has M number of storage locations and produce a set of the data samples including the current data sample in parallel. Then, the shift register 31, in response to a next data sample, store the next data sample and shifts the current data sample to produce a next set of the data samples. The set of data samples and the corresponding error signal are simultaneously coupled to the multiplier 32. The multiplier 32 multiplies the data samples with the corresponding error signal to provide a set of error weighted data samples. The set of error weighted data samples is then coupled to the scaling circuit 31.

The scaling circuit 33, in response to the blind mode signal from the mode selection circuit 26, serves to scale down the set of error weighted data samples with a first scale value in order to generate a first set of scaled error weighted data samples; while the scaling circuit 33, in response to a second control signal, serves to scale down the set of error weighted data samples with a second scale value to generate a second set of scaled error weighted data samples. As can be seen from Eq. (2), the first scale value is $2^{-10}$ and the second scale value is $2^{12}$. Therefore, the scaling circuit 33 is preferably implemented through the use of a 10-bit shifter 33a, 12-bit shifter 33b and a multiplexer 33c.

The 10-bit shifter 33a, as well known in the art, shifts all bits of the respective error weighted data sample by 10 bits to provide the first set of scaled error weighted data samples to the multiplexer 33c. In a similar manner, the 12-bit shifter 33b shifts all bits of the respective error weighted data sample by 12 bits to provide the second set of scaled error weighted data samples to the multiplexer 33c.

The multiplexer 33c, in response to a blind mode signal from the mode selection circuit 26, couples the first set of scaled error weighted data samples to the adder 34; and, in response to a decision mode signal from the mode selection circuit 26, provides the second set of scaled error weighted data samples to the adder 34.

The adder 34 receives the first or the second set of scaled error weighted data samples as a set of scaled error weighted data samples and a set of previous filter coefficients from the FIFO buffer memory 35 and adds the set of scaled error weighted data samples to the set of previous filter coefficients to produce a set of updated filter coefficients as an output of the updating circuit which is coupled to the equalizer filter 10 and the FIFO buffer memory 35.

The FIFO buffer memory 35 serves to store the set of updated filter coefficients as the set of previous filter coefficients which is coupled to the adder 34.

As described above, the set of filter coefficients is iteratively and effectively updated by using the received data samples and the error signals until an optimum set of filter coefficients is obtained.

As may be seen from the above, since the coefficient updating circuit can be implemented by a unique combination of simple circuit components, e.g., a multiplier, a shifter, an adder and a multiplexer, updating of filter coefficients can be effectively performed without an additive delay. Further, the first and the second error signals are pre-calculated and stored in the first and the second memories, respectively, to be accessed by the filtered data samples. As a result, the error signals can be obtained with a greatly reduced delay time to thereby achieve a speedy coefficient updating operation of the equalization apparatus.

While the present invention has been described with respect to certain preferred embodiments only, other modifications and variations may be made without departing from the spirit and scope of the present invention as set forth in the following claims.

What is claimed is:

1. An equalization apparatus for use in a television signal receiving system, which includes an equalizing filter having a set of filter coefficients for equalizing a received television signal distorted from an original signal in a transmission channel to produce a filtered output signal, wherein the received television signal includes a plurality of data samples and the filtered output signal has a corresponding plurality of filter output data samples; and error signal generating means for storing a set of error values, and for generating, in response to a filtered output data sample, an error signal corresponding to said filtered output data sample; and updating circuit for generating, in response to the data sample and the error signals, a set of updated filter coefficients as the set of filter coefficients for the equalizer filter, characterized in that said updating circuit comprises:

a shift register for storing and shifting the data sample to provide a set of the data samples;

a multiplier for multiplying said error signal with the set of the data samples to provide a set of error weighted data samples;

a scaling circuit, in response to a first control signal, for scaling down the set of error weighted data samples with a first scale value in order to generate a first set of scaled error weighted data samples and, in response to a second control signal, for scaling down the set of error weighted data samples with a second scale value to generate a second set of scaled error weighted data samples;

adder means for adding the first or the second set of scaled error weighted data samples to a set of previous filter coefficients in order to produce said set of updated filter coefficients as an output of the updating circuit;

FIFO buffer means for storing the set of updated filter coefficients as the set of previous filter coefficients for the adder means; and control means for generating the second control signal when the mean square error of the filtered output signal is identical to or smaller than a predetermined threshold value and for generating the first control signal when the mean squared error is greater than the predetermined threshold value.

2. The equalization apparatus as recited in claim 1, wherein the scaling circuit includes:

an N-bit shifter for shifting all bits of the respective error weighted data sample by N bits to produce the first set of scaled error weighted data samples;

an M-bit shifter for shifting all bits of the respective error weighted data sample by M bits to produce the second set of scaled error weighted data samples wherein N and M are positive integers; and a multiplexer, in response to a first control signal, for providing the first set of scaled error weighted data samples to the adder means and, in response to a second control signal, for providing the second set of scaled error weighted data samples.

3. The equalization apparatus as recited in claim 2, wherein said error signal generating means includes:

first memory means for storing a set of coarse error values, each of the coarse error values representing the difference between a predicted filtered data sample and a predetermined value, and for generating, in response to a filtered data sample corresponding to said predicted filtered data sample, a first error signal representative of the corresponding coarse error value as the error signal; and second memory means for storing a set of fine error values, each of the fine error values representing the difference between a predicted filtered data sample and a corresponding original data sample, and for generating, in response to a filtered data sample corresponding to said predicted filtered data sample and a control signal, a second error signal representative of the corresponding fine error value as the error signal.

* * * * *